United States Patent
Petelka

(10) Patent No.: US 7,374,225 B2
(45) Date of Patent: May 20, 2008

(54) SLIDING TARPAULIN SYSTEMS AND COMPONENTS FOR FLATBED TRAILERS OR TRUCK BODIES

(76) Inventor: Brian W. Petelka, 33 Appaloosa Trail, Carlisle, Ontario (CA) L0R 3H0

( * ) Notice: Subject to any disclaimer, the term of this patent is extended or adjusted under 35 U.S.C. 154(b) by 14 days.

(21) Appl. No.: 11/521,468

(22) Filed: Sep. 15, 2006

(65) Prior Publication Data

US 2007/0063530 A1   Mar. 22, 2007

(30) Foreign Application Priority Data

Sep. 16, 2005   (CA) .................... 2515656

(51) Int. Cl.
*B60P 7/04*   (2006.01)
*E04H 15/44*   (2006.01)

(52) U.S. Cl. .............. 296/100.11; 296/105; 52/79.5; 135/133; 160/352

(58) Field of Classification Search ........... 296/100.01, 296/100.11, 100.12, 100.13, 100.14, 100.17, 296/100.18, 102, 104, 105; 52/5, 23, 67, 52/68, 79.1, 79.5, 169.12, 169.13, 222; 135/88.13, 135/88.15, 124, 129, 132, 133; 160/132, 160/201, 352

See application file for complete search history.

(56) References Cited

U.S. PATENT DOCUMENTS

| | | | | |
|---|---|---|---|---|
| 1,052,076 A * | 2/1913 | McClellan | ............... | 135/132 |
| 1,863,957 A * | 6/1932 | Woolcott | ............... | 296/105 |
| 2,817,344 A * | 12/1957 | Teeter | ............... | 135/129 |
| 3,415,260 A * | 12/1968 | Hall | ............... | 135/129 |
| 3,606,448 A * | 9/1971 | Walker | ............... | 296/105 |
| 3,773,379 A * | 11/1973 | Loiseau | ............... | 296/107.09 |
| 4,310,194 A * | 1/1982 | Biller | ............... | 296/159 |
| 4,711,484 A | 12/1987 | Tuerk | | |
| 4,730,866 A | 3/1988 | Nett | | |
| 4,887,860 A * | 12/1989 | Dowty | ............... | 296/26.05 |
| 4,902,064 A | 2/1990 | Tuerk et al. | | |
| 5,080,422 A * | 1/1992 | DeMonte et al. | ........... | 296/105 |
| 5,152,575 A | 10/1992 | DeMonte et al. | | |
| 5,238,288 A * | 8/1993 | Chandler | ............... | 296/100.18 |

(Continued)

FOREIGN PATENT DOCUMENTS

CA   2271280   11/1999

(Continued)

*Primary Examiner*—D. Glenn Dayoan
*Assistant Examiner*—Paul Chenevert
(74) *Attorney, Agent, or Firm*—Nixon Peabody LLP; Jeffrey L. Costellia

(57) ABSTRACT

A tarpaulin system that turns a flatbed trailer into a fully covered trailer and closes to provide an open flatbed trailer. The system is comprised of a plurality of inverted U-shaped support bows extending laterally across the trailer and secured to sections of the tarpaulin. Each support bow has rollers secured thereto for sliding movement along rails on each side of the trailer. A plurality of pairs of inverted U-shaped uplifting bows also extend laterally across the trailer and are pivotally secured to the support bows on opposite sides to spread apart during opening of the system. Intermediate support rods are secured between adjacent pairs of uplifting bows and extend laterally across the trailer between the uplifting bows beneath the tarpaulin sections to restrict the tarpaulin sections from falling between the uplifting bows when the system is closed.

8 Claims, 3 Drawing Sheets

U.S. PATENT DOCUMENTS

| | | | |
|---|---|---|---|
| 5,338,084 A * | 8/1994 | Wardell | 296/105 |
| 5,429,408 A | 7/1995 | Henning et al. | |
| 5,538,313 A * | 7/1996 | Henning | 296/100.12 |
| 5,722,716 A | 3/1998 | Thomas et al. | |
| 5,839,462 A * | 11/1998 | Randall | 135/128 |
| 5,934,735 A | 8/1999 | Wheatley | |
| 6,257,260 B1 * | 7/2001 | Phillips | 135/88.13 |
| 6,550,491 B1 * | 4/2003 | Bixler et al. | 135/145 |
| 6,616,211 B2 * | 9/2003 | Cramaro | 296/100.15 |
| 6,634,697 B1 | 10/2003 | Petelka | |
| 6,764,125 B2 | 7/2004 | Bacon | |
| 6,767,055 B1 | 7/2004 | Sparks | |
| 6,905,161 B2 * | 6/2005 | Fliege et al. | 296/100.18 |
| 6,976,433 B1 * | 12/2005 | Neumann | 105/377.03 |
| 2007/0063530 A1 * | 3/2007 | Petelka | 296/100.12 |
| 2007/0085369 A1 * | 4/2007 | Henning et al. | 296/100.12 |

FOREIGN PATENT DOCUMENTS

| | | | | |
|---|---|---|---|---|
| EP | 1331153 | | 7/2003 | |
| GB | 2157246 A | * | 10/1985 | 296/100.12 |
| GB | 2175632 A | * | 12/1986 | 296/186.1 |
| JP | 56047320 A | * | 4/1981 | 296/100.18 |
| JP | 63215424 A | * | 9/1988 | 296/100.12 |

* cited by examiner

SLIDING TARPAULIN SYSTEMS AND COMPONENTS FOR FLATBED TRAILERS OR TRUCK BODIES

FIELD OF THE INVENTION

The present invention relates to a tarpaulin support system for turning a flatbed trailer into a fully covered van and back again into an open flatbed trailer, and to components for that system.

BACKGROUND OF THE INVENTION

The present invention relates to improvements to the tarpaulin system described and illustrated in applicant's U.S. Pat. No. 6,634,697, issued Oct. 21, 2003. That patent describes and illustrates a tarpaulin support for a tarpaulin system that converts a flatbed trailer into a fully covered trailer and back again into an open flatbed trailer, as desired. A plurality of tubular bows of inverted U-shape construction extend laterally across the flatbed trailer and are moveable on rails mounted on opposite sides of the trailer between open and closed positions. Means are associated with each of these bows to secure thereto peripheral portions of tarpaulin sections for covering the trailer when the system is in the open position. Pairs of U-shaped uplifting bows are pivotally secured to lower portions of the arms of each of the tubular bows, on opposite sides, to spread apart during opening of the tarpaulin system and support the tarpaulin from beneath when the system is open, and to close to a position near the corresponding tubular bow members when the system is closed.

When the bows are moved to the closed position, in accordion fashion to one end of the trailer, portions of the tarpaulin sections tend to slip down between the bows thereby taking up cargo space at that end. Also, the portions of the tarpaulin which become squeezed between adjacent bows and uplift bows when the system is in the closed position are subject to increased wear and tear.

Other patents of general background interest relating to tarpaulin systems for flatbed trailers include U.S. Pat. No. 4,711,484 of Tuerk, issued Dec. 8, 1987, U.S. Pat. No. 4,902,064 of Tuerk et al., issued Feb. 20, 1990 and U.S. Pat. No. 5,429,408 of Henning et al., issued Jul. 4, 1995.

Also of general background interest is U.S. Pat. No. 5,934,735 of Wheatley, issued Aug. 10, 1999, which patent describes and illustrates a connector assembly for formation of a tonneau cover frame which may be easily and selectively secured to a vehicle and/or easily disassembled for storage.

Embodiments of the present invention provide a tarpaulin support system for flatbed trailers which will assist in holding the tarpaulin sections above the support and uplift bows when in closed position. Embodiments of the present invention also provide a more easily manufactured and transported tarpaulin support system of the type in question.

SUMMARY OF THE INVENTION

In accordance with an embodiment of the present invention there is provided a tarpaulin system that opens to convert a flatbed trailer into a fully covered trailer and closes to provide an open flatbed trailer. The system comprises a plurality of inverted U-shaped support bows to extend laterally across the trailer. Each side of each support bow has a downwardly extending arm terminating in an end. Means are associated with each support bow to secure thereto peripheral portions of tarpaulin sections for covering the trailer. A roller means is secured to each end of each support bow for sliding movement on a different one of a corresponding rail mounted on a corresponding side of the flatbed. A plurality of pairs of U-shaped uplifting bows are provided, each uplifting bow having a central portion that extends laterally across the trailer and arms downwardly extending from ends of the central portion. Each pair of uplifting bows is pivotally secured to lower portions of the arms of each support bow on opposite sides, to spread apart during opening of the tarpaulin system and support the tarpaulin sections from beneath when the system is open, and to close to a position near the corresponding support bow when the system is closed. An intermediate support rod is secured to each adjacent pair of uplifting bows secured to adjacent support bows, the intermediate support rods to extend laterally across the trailer between the uplifting bows beneath the tarpaulin sections and secured thereto so as to maintain the intermediate support bar at about the height of the support and uplifting bows when the tarpaulin system is open and raise it above that height to restrict the tarpaulin sections from falling between the uplifting bows when the tarpaulin system is closed.

In another embodiment of the present invention there is provided an intermediate support rod to be positioned between adjacent uplifting bows of a tarpaulin system that opens to convert a flatbed trailer into a fully covered trailer and closes to provide an open flatbed trailer so as to maintain the intermediate support rod at about the height of the uplifting bows when the tarpaulin system is opened and raise it above that height to restrict the tarpaulin sections from falling between the uplifting bows when the tarpaulin system is closed. The intermediate support rod is rotatably supported by overlapping portions of co-operating pairs of tabs to be secured in overlapping fashion along central portions of the adjacent uplifting bows.

In yet a further embodiment of the present invention there is provided a corner member for formation of a modular uplifting bow of inverted U-shape, the bow having a pair of downwardly extending arms and a linear central portion extending between the arms, the bow to extend laterally across a flatbed trailer to support a tarpaulin. The corner member comprises a pair of arms extending outwardly from a central portion at an angle of about 90°, ends of the arms being provided with means securely to mate with the central portion of the bow and with one of the arms.

With this construction of tarpaulin system, because of the presence and operation of the intermediate support bars between the uplifting bows, tarpaulin sections are prevented from falling between the bows as they are moved into the closed position. This frees up more storage space beneath the bows when in the closed position and provides less wear and tear on the tarpaulin sections themselves since they do not become trapped between the uplifting bows and the support bows when they close.

With respect to the corner member construction, both manufacturing and installation of tarpaulin systems of the type in question are significantly facilitated, as will be described in more detail subsequently with respect to the embodiment of the present invention.

BRIEF DESCRIPTION OF THE DRAWINGS

These and other advantages of the invention will become apparent upon reading the following detailed description and upon referring to the drawings in which.

Figure 1:
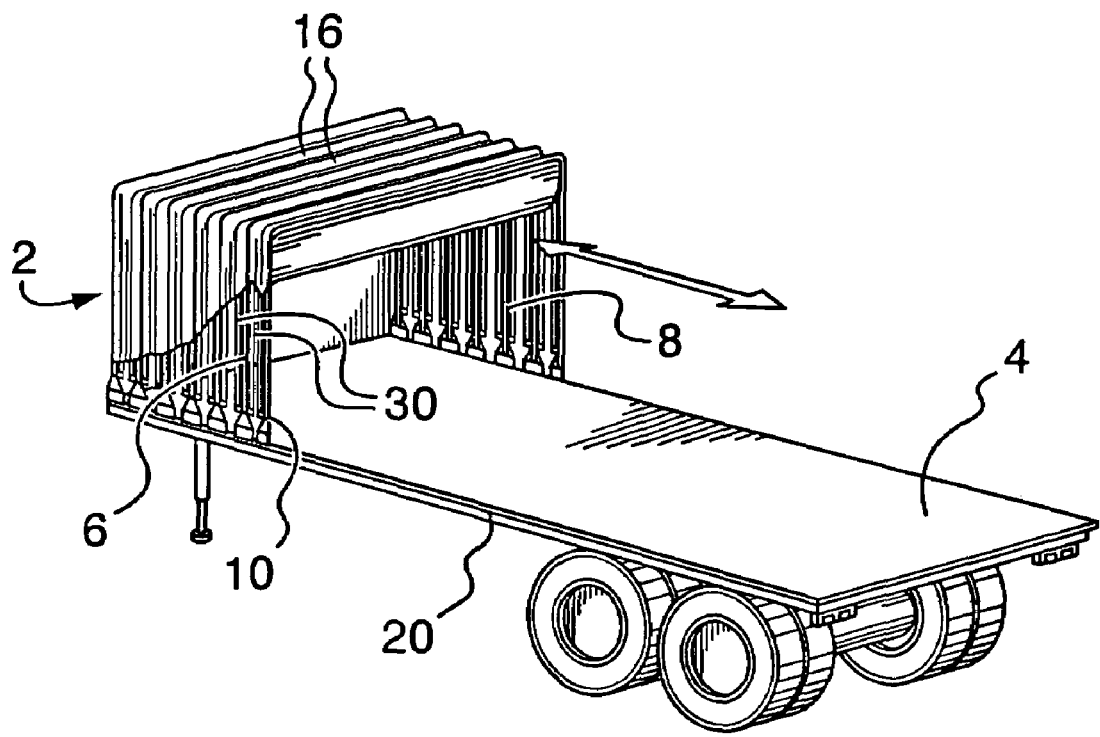
FIG. 1 is a perspective view from the side and rear of an embodiment of a tarpaulin system in accordance with the present invention.

While the invention will be described in conjunction with the illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given identical reference numerals where appropriate.

Figure 2:
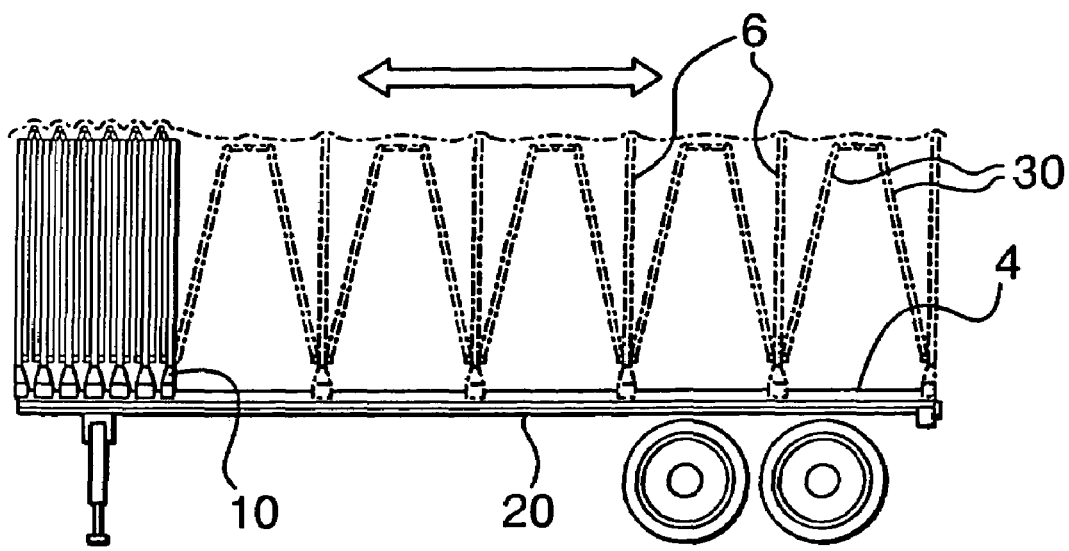
FIG. 2 is a side view of the tarpaulin system of FIG. 1, in the closed position and (phantom) in the open position.
Figure 3:
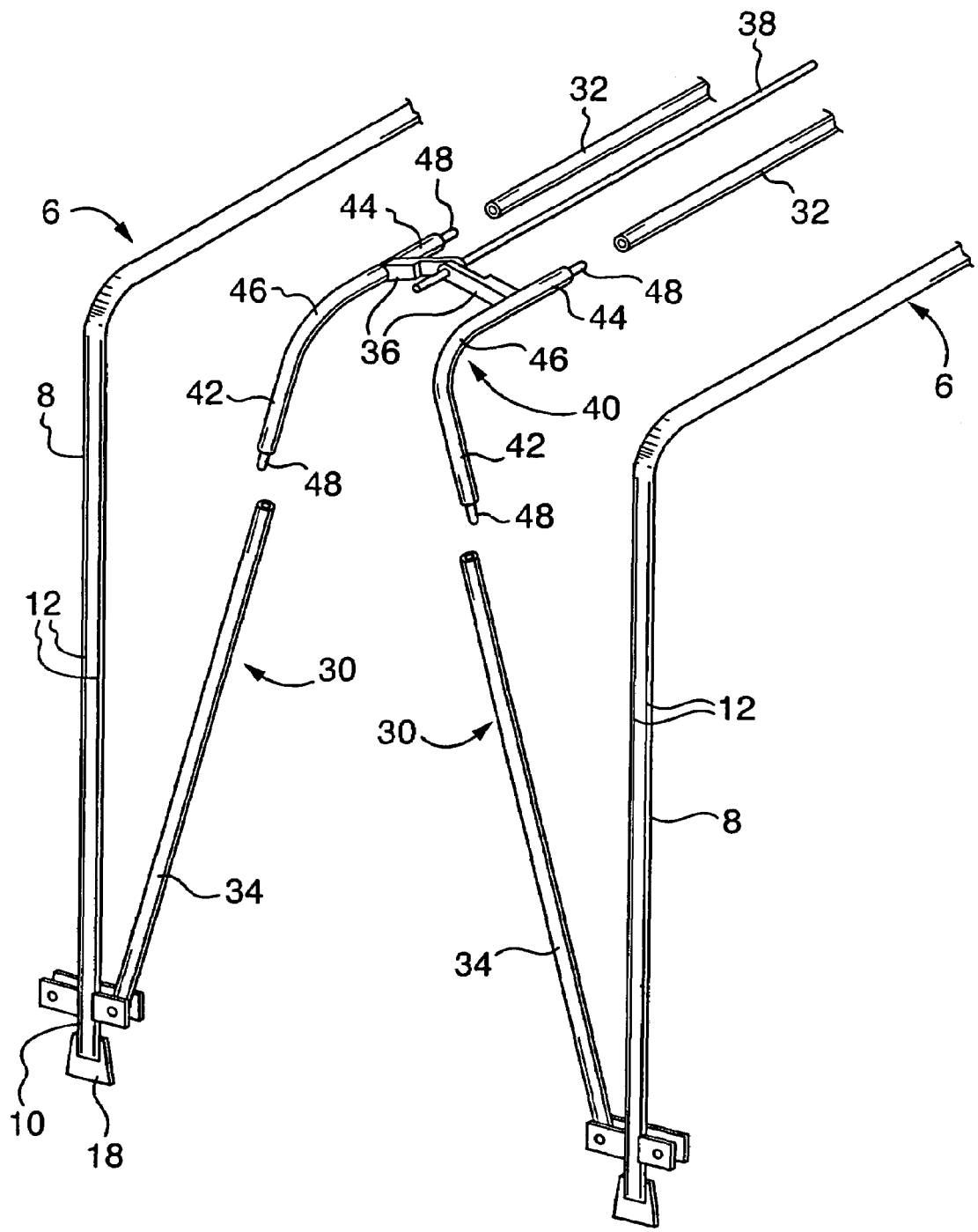
FIG. 3 is a partial perspective, partially exploded view of adjacent pairs of support bows and uplifting bows of the system of FIGS. 1 and 2 in the open position, illustrating in more detail the positioning of the intermediate support rod therebetween and components of the system.

Referring to FIGS. 1, 2 and 3, there is illustrated a tarpaulin system (2) that opens to convert a flatbed trailer (4) into a fully covered trailer and closes to provide an open flatbed trailer. This tarpaulin system comprises a plurality of inverted U-shaped support bows (6) which extend laterally across the trailer (4). Each side of each of these support bows (6) has a lateral, downwardly extending arm (8) terminating in an end (10). There is provided a means (12) associated with each of these support bows (6) to secure thereto peripheral portions of tarpaulin sections (16) for covering the trailer (4). There is also provided roller means (18) secured to each end (10) of each support bow (6) for sliding movement on a different one of a corresponding rail (20) mounted on a corresponding side of the flatbed trailer (4). On opposite sides of each of the lower portions of the arms (8) are pivotally secured U-shaped uplifting bows (30) as illustrated. These uplifting bows have central portions (32) to extend laterally across the trailer (4) and arms (34) downwardly extending from ends of the central portions (32).

Figure 4A:
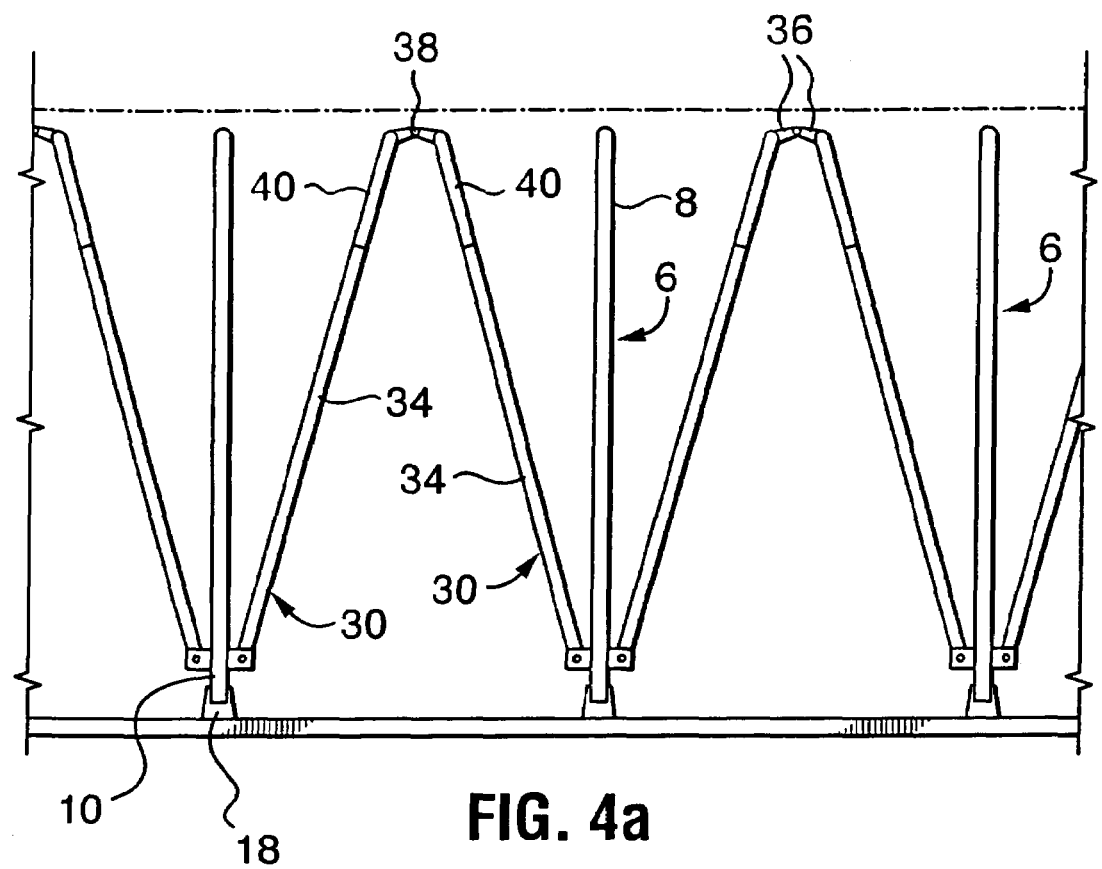
FIGS. 4a and 4b are partial side views of the system of FIGS. 1 to 3 in, respectively, the open and closed positions.
Figure 4B:
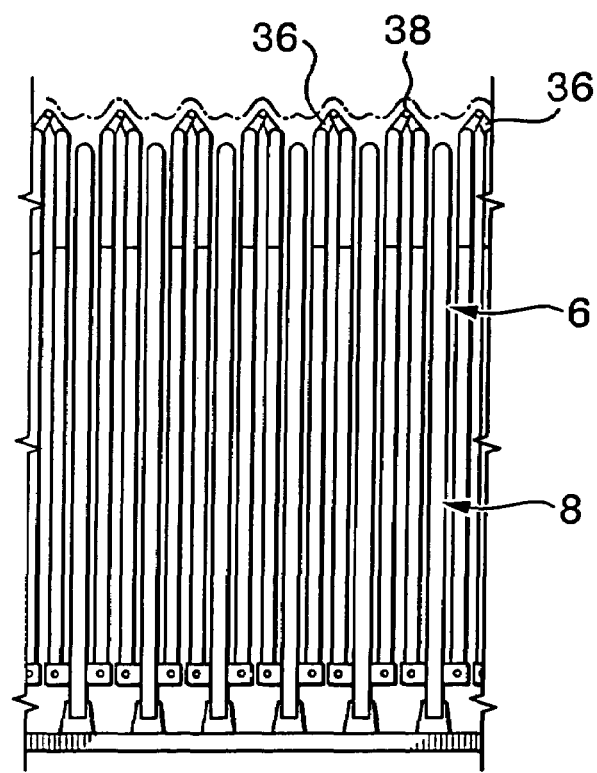

On central portions (32) of adjacent uplifting bows (30) of adjacent support bows (6) are a plurality of co-operating pairs of tabs (36), as illustrated. The tabs (36) of each pair overlap and, through aligned apertures in overlapping portions, support an intermediate support rod (38). These intermediate support rods (38) extend laterally across the trailer (4) between such adjacent pairs of uplifting bows (30) beneath the tarpaulin sections (16). As illustrated in FIGS. 4a (where the system is shown in the open position) and FIG. 4b (where the system is shown in the closed position), the tabs (36) are of such a length and the intermediate support rod (38) is positioned with respect to co-operating pairs of such tabs (36) so that tarpaulin sections (16) are maintained above the support bows (6) and uplifting bows (30), at all times. When the tarpaulin system (2) is closing (FIG. 4b), the pivoting movement of arms (34) of co-operating pairs of uplifting bows (30) forces co-operating pairs of tabs (36) to rotate somewhat upwardly with respect to the "horizontal" level established by flatbed trailer (4). As a result, tarpaulin sections (16) are raised somewhat higher, thereby ensuring that they do not slip between adjacent uplifting bows or between uplifting bows (30) and support bows (6).

While the central portions (32) and arms (34) of uplifting bows (30) may be of integral construction, in the embodiment of the present invention illustrated in FIG. 3, a separate, curved corner member (40) is provided, to which the ends of central portions (32) and upper ends of arms (34) are secured. As well, tabs (36) are secured to these corner sections (40). More particularly, each curved corner member (40) comprises a pair of arms (42, 44) extending outwardly from a central curved portion (46) at an angle of approximately 90°. The ends of arms (42, 44) are provided with mating means (48) to securely mate with the central portion (32) and the corresponding arm (34). This may be accomplished, for example, by crimping or providing a plug at these arm ends (42, 44). A similar modular corner construction for support bows (6) (without tabs (36)) may also be provided. In addition, the corner member (40) does not have to be curved.

This modular corner construction of the uplifting (and support) bows significantly facilitates handling of system (2) (e.g. for shipping), and enables on-site, out-of-factory modification of the system to a particular size of trailer (4) since the arms and the upper central portions of the bows can be cut to the height and width required, and joined by these corner sections. In addition, while in the drawings the central portions are shown to be linear, the skilled person would understand that the upper central portions of the support and uplifting bows could be curved or comprise several linear potions. Thus, the modular corner construction also facilitates modification of the shape of the system (2).

Thus, it is apparent that there has been provided in accordance with the invention a sliding tarpaulin system and components for flatbed trailers or truck bodies that fully satisfy the objects, aims and advantages set forth above. While the invention has been described in conjunction with illustrated embodiments thereof, it is evident that many alternatives, modifications and variations will be apparent to those skilled in the art in light of the foregoing description. For example, the intermediate support rod (38) may be supported on adjacent uplifting bows (30) by any other suitable support means, as an alternative to tabs (36), which alternatives will be readily apparent to one skilled in the art. Accordingly, it is intended to embrace all such alternatives, modifications and variations as fall within the spirit and broad scope of the invention.

The invention claimed is:

1. A tarpaulin system that opens to convert a flatbed trailer into a fully covered trailer and closes to provide an open flatbed trailer, the system comprising:
   (a) a plurality of inverted U-shaped support bows to extend laterally across the trailer, each side of each support bow having a downwardly extending arm terminating in an end;
   (b) means associated with each support bow to secure thereto peripheral portions of tarpaulin sections for covering the trailer;
   (c) roller means secured to each end of each support bow for sliding movement on a different one of a corresponding rail mounted on a corresponding side of the flatbed trailer;
   (d) a plurality of pairs of inverted U-shaped uplifting bows having central portions to extend laterally across the trailer and arms downwardly extending from ends of the central portions, each pair of uplifting bows pivotally secured to lower portions of the arms of each support bow on opposite sides, to spread apart during opening of the tarpaulin system and support the tarpaulin sections from beneath when the system is open, and to close to a position near the corresponding support bows when the system is closed;

(e) an intermediate support rod secured to each adjacent pair of uplifting bows secured to adjacent support bows, the intermediate support rods to extend laterally across the trailer between the uplifting bows beneath the tarpaulin sections, said intermediate support rods being secured to said uplifting bows so as to maintain the intermediate support rods at about the height of the support and uplifting bows when the tarpaulin system is open and raise it above that height to restrict the tarpaulin sections from falling between the uplifting bows when the tarpaulin system is closed.

2. A tarpaulin system according to claim 1, wherein the intermediate support rods are of a length to extend laterally across the trailer in the area between the inverted U-shaped bows.

3. A tarpaulin system according to claim 1, wherein a corner member is secured to each end of each of the central portions of the uplifting bows and to each of their downwardly extending arms, the corner members each comprising a pair of arms extending outwardly from a central portion at an angle of about 90°, ends of the arms being provided with means to mate securely with the central portion of the uplifting bow and the corresponding arm.

4. A tarpaulin system according to claim 1, wherein co-operating pairs of overlapping tabs are secured along central portions of the adjacent pairs of uplifting bows, the intermediate support rods supported by overlapping portions of the tabs so as to rotate relative thereto and to maintain the intermediate support rods in proper position during operation of the system.

5. A tarpaulin system according to claim 4, wherein the intermediate support rods are of a length to extend laterally across the trailer in the area between the tubular bows.

6. A tarpaulin system according to claim 4, wherein a corner member is secured to the end of each of the central portions of the uplifting bows and to each of their downwardly extending arms, the corner members each comprising a pair of arms extending outwardly from a central portion at an angle of about 90°, ends of the arms being provided with means to mate securely with the central portion of the uplifting bow and the corresponding arm.

7. A tarpaulin system according to claim 6, wherein the tabs for the intermediate support rods are secured to the corner members.

8. An intermediate support rod to be positioned between a pair of adjacent uplifting bows of a tarpaulin system that opens to convert a flatbed trailer into a fully covered trailer and closes to provide an open flatbed trailer, so as to maintain the intermediate support rod at about the height of the uplifting bows when the tarpaulin system is opened and raise the intermediate support above that height to restrict the tarpaulin sections from falling between the uplifting bows when the tarpaulin system is closed, the intermediate support rod rotatably supported by overlapping portions of a co-operating pair of tabs to be secured in overlapping fashion along central portions of the adjacent uplifting bows.

* * * * *